(12) United States Patent
Fan et al.

(10) Patent No.: US 11,317,067 B2
(45) Date of Patent: Apr. 26, 2022

(54) METHOD AND SYSTEM FOR INSPECTING DISPLAY IMAGE

(71) Applicant: Coretronic Corporation, Hsin-Chu (TW)

(72) Inventors: Jyun-Siang Fan, Hsin-Chu (TW); Huai-En Wu, Hsin-Chu (TW); Pei-Chi Hsiao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/128,181

(22) Filed: Dec. 20, 2020

(65) Prior Publication Data
US 2021/0195154 A1 Jun. 24, 2021

(30) Foreign Application Priority Data
Dec. 23, 2019 (TW) .................................. 108147137

(51) Int. Cl.
*H04N 9/31* (2006.01)
*H04N 17/00* (2006.01)
(Continued)

(52) U.S. Cl.
CPC ......... *H04N 9/3191* (2013.01); *G06T 7/0002* (2013.01); *G06T 7/11* (2017.01);
(Continued)

(58) Field of Classification Search
CPC .... H04N 9/3191; H04N 17/004; G06T 7/194; G06T 7/11; G06T 7/90; G06T 2207/10024; G09G 3/006; G06V 10/751
See application file for complete search history.

(56) References Cited

U.S. PATENT DOCUMENTS

| 7,173,736 B2 * | 2/2007 | Yamada | H04N 1/6058 |
| | | | 358/1.9 |
| 7,436,995 B2 * | 10/2008 | Ito | H04N 1/6088 |
| | | | 382/162 |

(Continued)

FOREIGN PATENT DOCUMENTS

| CN | 105430364 | 3/2016 |
| CN | 105611259 | 5/2016 |

(Continued)

OTHER PUBLICATIONS

Jae Y. Lee et al., "Automatic detection of region-mura defect in TFT-LCD," IEICE Transactions on Information and Systems, vol. E87-D, No. 10, Oct. 2004, pp. 2371-2378.

(Continued)

*Primary Examiner* — Brian P Yenke
(74) *Attorney, Agent, or Firm* — JCIPRNET

(57) ABSTRACT

A method and a system for inspecting a display image are provided. A test image is displayed on a display surface through a display device. An optical inspection image is generated by photographing the test image on the display surface by an image capturing device. A brightness channel image and a color channel image of the optical inspection image are obtained by performing color space transformation on the optical inspection image. Background estimation is applied to the color channel image to obtain a color channel background image. At least one color nonuniformity region in the test image is obtained by respectively comparing an inspection reference value with multiple color component pixel values of the color channel background image.

18 Claims, 5 Drawing Sheets

(51) Int. Cl.
    *G06T 7/00*            (2017.01)
    *G06T 7/11*            (2017.01)
    *G06T 7/194*          (2017.01)
    *G06T 7/90*            (2017.01)
    *G06V 10/75*          (2022.01)

(52) U.S. Cl.
    CPC .......... *G06T 7/194* (2017.01); *G06T 7/90* (2017.01); *G06V 10/751* (2022.01); *H04N 17/004* (2013.01); *G06T 2207/10024* (2013.01)

(56) References Cited

U.S. PATENT DOCUMENTS

| | | | | |
|---|---|---|---|---|
| 8,368,750 | B2 * | 2/2013 | Mori | G06T 11/206 |
| | | | | 348/92 |
| 8,780,210 | B1 * | 7/2014 | Steinberg | H04N 17/004 |
| | | | | 348/188 |
| 9,135,851 | B2 * | 9/2015 | Rykowski | G09G 3/20 |
| 9,990,874 | B2 * | 6/2018 | Aimonen | G09G 3/006 |
| 10,235,914 | B2 * | 3/2019 | Richards | G06T 7/90 |
| 10,460,681 | B2 * | 10/2019 | An | G09G 3/006 |
| 10,638,125 | B1 * | 4/2020 | Lu | G06T 7/0002 |
| 10,733,763 | B2 * | 8/2020 | Lee | G09G 3/006 |
| 10,798,373 | B2 * | 10/2020 | Speigle | G09G 3/34 |
| 10,839,731 | B2 * | 11/2020 | Kim | G09G 3/006 |
| 11,134,241 | B2 * | 9/2021 | Lu | H04N 9/646 |
| 2009/0244309 | A1 * | 10/2009 | Maison | A63F 13/06 |
| | | | | 348/222.1 |
| 2013/0148899 | A1 * | 6/2013 | Kim | G06K 9/4652 |
| | | | | 382/195 |
| 2015/0221078 | A1 * | 8/2015 | Kim | G09G 3/006 |
| | | | | 345/1.3 |
| 2015/0317929 | A1 * | 11/2015 | You | G09G 3/006 |
| | | | | 345/604 |
| 2018/0315196 | A1 * | 11/2018 | Socek | G06V 10/56 |
| 2019/0191153 | A1 * | 6/2019 | Speigle | G09G 5/10 |
| 2019/0197678 | A1 | 6/2019 | Lu et al. | |
| 2021/0029332 | A1 * | 1/2021 | Hsiao | H04N 9/3182 |
| 2021/0051305 | A1 * | 2/2021 | Takahashi | H04N 9/3191 |
| 2021/0152738 | A1 * | 5/2021 | Kim | H04N 5/23232 |
| 2022/0012864 | A1 * | 1/2022 | Zhao | G01N 21/88 |

FOREIGN PATENT DOCUMENTS

| | | |
|---|---|---|
| CN | 106770362 | 5/2017 |
| CN | 106200047 | 3/2019 |

OTHER PUBLICATIONS

"Office Action of Taiwan Counterpart Application", dated Jan. 11, 2021, p. 1-p. 8.

\* cited by examiner

METHOD AND SYSTEM FOR INSPECTING DISPLAY IMAGE

CROSS-REFERENCE TO RELATED APPLICATION

This application claims the priority benefit of Taiwan application serial no. 108147137, filed on Dec. 23, 2019. The entirety of the above-mentioned patent application is hereby incorporated by reference herein and made a part of this specification.

BACKGROUND

Technical Field

The disclosure relates to a method for inspecting a display device, and particularly relates to a method and a system for inspecting a display image displayed on the display device.

Description of Related Art

A projection device is a display device that may be used to generate large-scale images. When the projection device projects an image, an illumination light beam generated by a light source is projected to a light valve after being split and shaped. Namely, the light beam needs to go through many reflection and refraction paths to complete the projection. Therefore, a path length of the light beam from the light source to a projection surface, a loss of optical components, an assembly defect of an optical engine device, or other factors may all cause brightness or chromaticity nonuniformity of a projection image that is finally displayed on the projection surface. The most common image nonuniformity is that a center area of the projection image is brighter but a peripheral area of the projection image is darker, or a color performance of the peripheral area of the projection image is different from a color performance of the center area of the projection image.

Therefore, in order to ensure a normal display function of each projection device, a conventional projection device detection method is to control the projection device to project a test image, and then an inspector inspects with his naked eyes whether the test image displayed on the projection surface has brightness or chromaticity nonuniformity. However, after the inspector views a large number of test images for a long time, his eyes are liable to visual fatigue or visual persistence, which may affect the detection ability of the inspector and lead to misjudgment. Moreover, when the inspector wants to check whether the test image on the projection surface has the defect of chromaticity nonuniformity through the naked eye, the phenomenon of brightness nonuniformity in the test image may interfere with the inspector's judgment, thereby causing difficulty in identifying the chromaticity nonuniformity. Moreover, there are doubts on objectivity and impartiality of human eye inspection, and different inspectors may have different judgment results, so that it is difficult to maintain consistency of detection standards.

Moreover, although there is currently a proposal to replace human eye inspection with an image capturing device and an image analysis technology, most current inspection algorithms take the brightness information into consideration, so it is impossible to accurately judge only the defects of color nonuniformity. On the other hand, even if RGB channel images of the test image may be inspected separately, the influence of the defect of brightness nonuniformity in single-channel images (i.e., an R-channel image, a G-channel image, and a B-channel image) on RGB channel component pixel values is far greater than the influence of the defect of color nonuniformity on the RGB channel component pixel values, so that it is not easy to inspect through the RGB channel images that the test image displayed on the projection surface has detects of color nonuniformity.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a method for inspecting a display image and a display image inspecting system, which are capable of effectively and accurately inspecting whether an image provided by a display device has color nonuniformity.

In order to achieve one or a portion of or all of the objects or other objects, an embodiment of the invention provides a method for inspecting a display image including following steps: displaying a test image on a display surface through a display device; generating an optical inspection image by photographing the test image on the display surface by an image capturing device; performing color space transformation on the optical inspection image to obtain a brightness channel image and a color channel image of the optical inspection image; performing background estimation on the color channel image to obtain a color channel background image: and obtaining at least one color nonuniformity region in the test image by respectively comparing an inspection reference value with a plurality of color component pixel values of the color channel background image.

In order to achieve one or a portion of or all of the objects or other objects, an embodiment of the invention provides a display image inspection system including a display device, an image capturing device and a computation device. The display device displays a test image on a display surface. The image capturing device photographs the test image on the display surface to generate an optical inspection image. The computation device is connected to the image capturing device and execute following steps. Color space transformation is performed on the optical inspection image to obtain a brightness channel image and a color channel image of the optical inspection image. Background estimation is performed on the color channel image to obtain a color channel background image. At least one color nonuniformity region in the test image is obtained by respectively comparing an inspection reference value with a plurality of color component pixel values of the color channel background image.

Based on the above description, in the embodiments of the invention, when it is required to inspect whether the test image displayed by the display device has color nonuniformity, the image capturing device photographs the test image to generate the optical inspection image, and separates the brightness information and the color information of the optical inspection image to obtain the brightness channel image and at least one color channel image. Therefore, in case of the absence of brightness information interference, the color channel image may be used to accurately detect the defect of color nonuniformity of the test image. Moreover, compared to human eye inspection, the embodiments of the invention provide a more efficient and consistent inspection method.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described and are not intended to be limiting of the invention.

Figure 1:
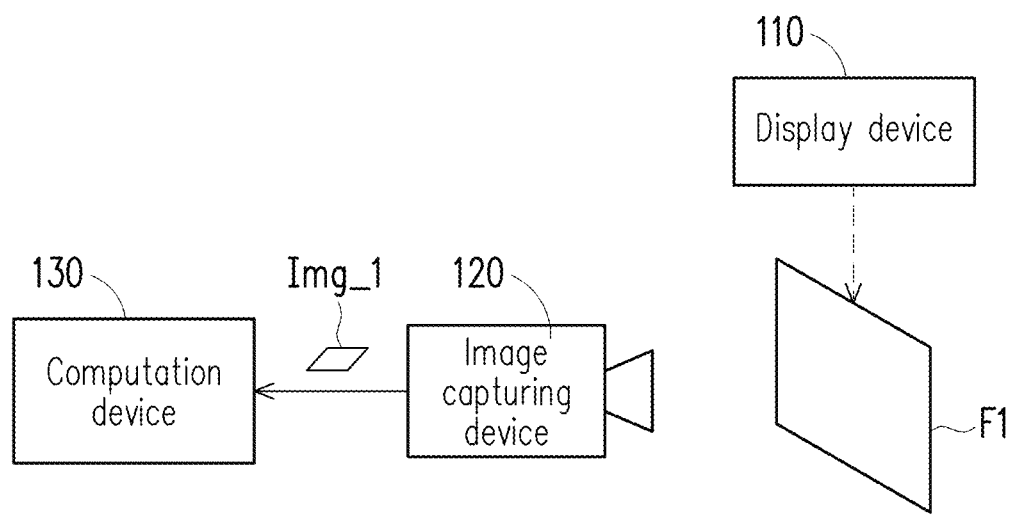
FIG. 1 is a schematic diagram of a display image inspection system according to an embodiment of the invention.

FIG. 1 is a schematic diagram of a display image inspection system according to an embodiment of the invention. Referring to FIG. 1, the display image inspection system 10 includes a display device 110, and image capturing device 120 and a computation device 130. The display image inspection system 10 is configured to inspect whether a display image of the display device 110 has color nonuniformity.

The display device 110 has an image display function, and is configured to display a test image F1 on a display surface. The display device 110 may be a projection device or a display panel. For example, the display device 110 may be a Liquid Crystal Display (LCD), a Light-Emitting Diode (LED) display, an Organic Light-Emitting Diode (OLED) display, a Field Emission Display (FED) or other types of display device. Alternatively, the display device 110 may be a Liquid Crystal Projector (LCP), a Digital Light Processing (DLP) projector, a Liquid Crystal On Silicon (LCOS) projector or other types of projection device.

The image capturing device 120 is coupled to the computation device 130, and is configured to capture the test image F1 displayed by the display device 110. The image capturing device 120 may include a camera device having a lens and a photosensitive element. The photosensitive element is configured to sense an intensity of light entering the lens, so as to generate a captured image. The photosensitive element is, for example, a Charge Coupled Device (CCD), a Complementary Metal Oxide Semiconductor (CMOS) device or other device, which is not limited by the invention. Further, the image capturing device 120 photographs the test image F1 displayed by the display device 110 to obtain an optical inspection image Img_1, and provides the optical inspection image Img1 to the computation device 130 for analysis to determine whether the image display function of the display device 110 is qualified.

The computation device 130 includes a memory and at least one processor coupled to the memory. The computation device 130 may be a computer control system having a computation power such as a desktop computer, a notebook computer, a work station, an industrial computer, a server host, etc. The memory may be any type of a non-transitory, volatile, non-volatile data storage device, which is configured to store buffer data, permanent data, and compiled codes used for executing functions of the computation device 130. The processor may be a Field Programmable Array (FPGA), a Programmable Logic Device (PLD), an Application Specific Integrated Circuits (ASIC), other similar device or a combination of the above devices. The processor may also be a Central Processing Unit (CPU), or other programmable general purpose or special purpose microprocessor, a Digital Signal Processor (DSP), a Graphics Processing Unit (GPU), other similar device or a combination of the above devices.

Figure 2A:
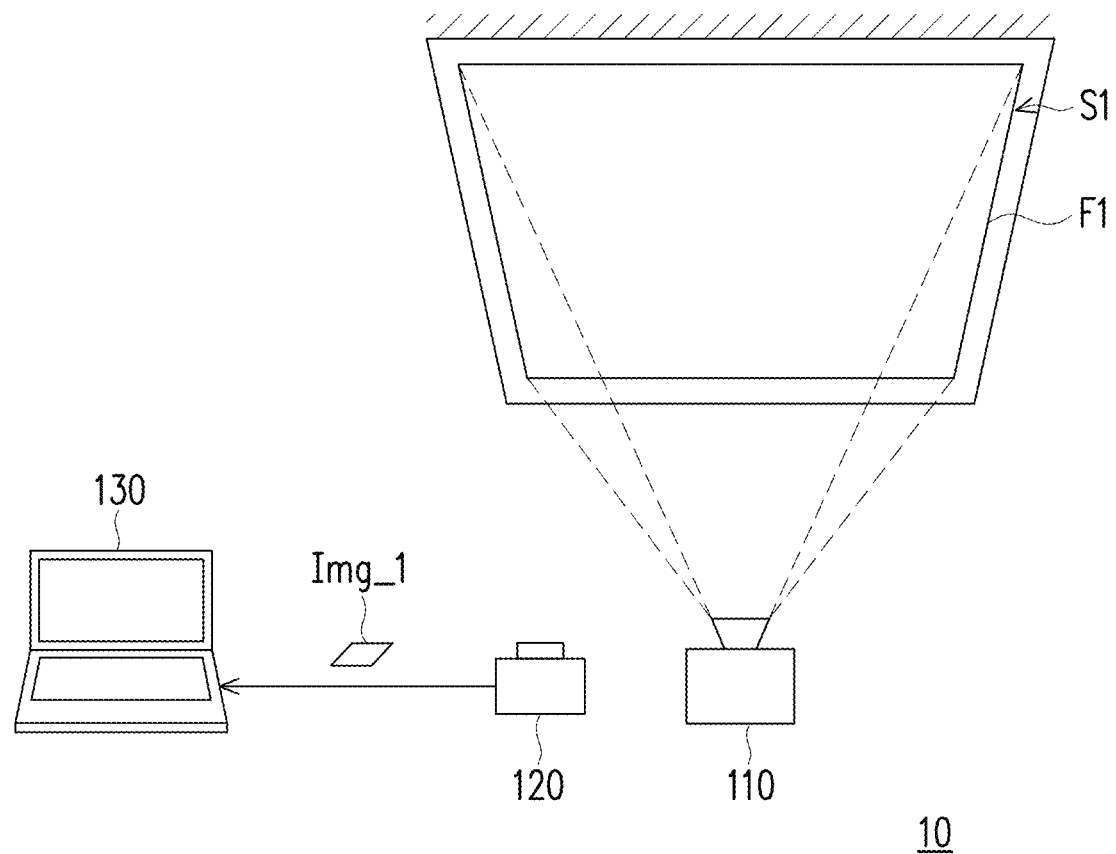
FIG. 2A and FIG. 2B are situational schematic diagrams of the display image inspection system according to an embodiment of the invention.
Figure 2B:
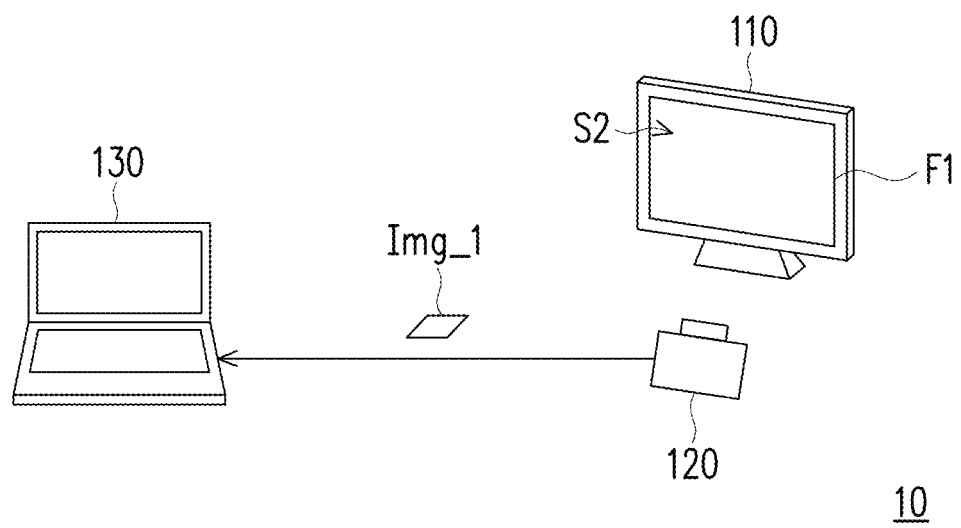

FIG. 2A and FIG. 2B are situational schematic diagrams of the display image inspection system according to an embodiment of the invention. Referring to FIG. 2A, in the embodiment, the display device 110 is a projection device, and the projection device 110 projects the test image F1 on a projection surface S (the display surface). The image capturing device 120 photographs the test image F1 on the projection surface S1 to obtain an optical inspection image Img_1, and transmits the optical inspection image Img_1 to the computation device 130, and the computation device 130 determines whether the projection function of the projection device is normal or abnormal according to the optical inspection image Img_1. Referring to FIG. 2B, in the embodiment, the display device 110 is a flat panel display, and the flat panel display displays the test image F1 on a display surface S2. The image capturing device 120 photographs the test image F1 on the display surface S2 to obtain the optical inspection image Img_1, and transmits the optical inspection image Img_1 to the computation device 130, and the computation device 130 determines whether the display function of the flat panel display is normal or abnormal according to the optical inspection image Img_1. Further, since the image content of the test image F1 is predetermined, the computation device 130 may inspect whether the image display function of the display device 110 is normal or abnormal by analyzing the optical inspection image Img_1 obtained by photographing the test image F1, such as to determine whether the test image F1 contains a color nonuniformity region.

Figure 3:
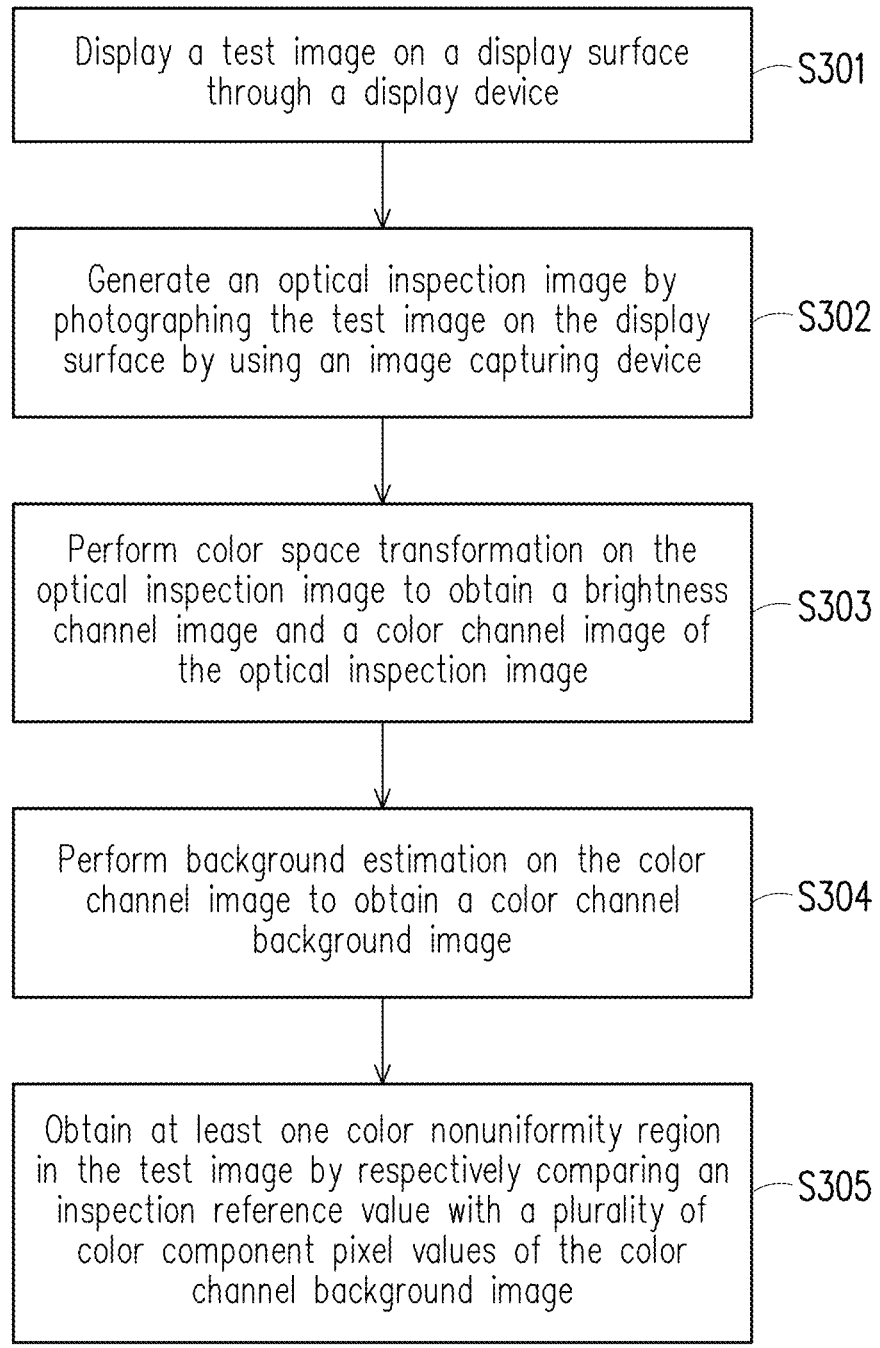
FIG. 3 is a flowchart illustrating a method for inspecting a display image according to an embodiment of the invention.

An embodiment is provided to describe how the computation device 130 determines whether the test image F1 includes the color nonuniformity region in detail. FIG. 3 is a flowchart illustrating a method for inspecting a display image according to an embodiment of the invention, and the method flow of FIG. 3 may be implemented by various components of the display image inspection system 10 of FIG. 1. Referring to FIG. 1 and FIG. 3, steps of the method for inspecting a display image of the embodiment are described below with reference of various components of the display image inspection system 10 of FIG. 1.

In a step S301, the display device 110 displays the test image F1 on the display surface. In an embodiment, the test image F1 may be a single color image, for example, a white color image, but the invention is not limited thereto. In a step S302, the image capturing device 120 photographs the test image F1 on the display surface to generate the optical inspection image Img_1. In an embodiment, the image content of the optical inspection image Img_1 at least contains the entire test image F1. Moreover, the computation device 130 may further perform correction processing or trim processing on the optical inspection image Img_1. To be specific, based on a configuration position and a capturing angle of the image capturing device 120, the computation device 130 may perform preprocessing such as rectangle correction, edge detection, image trimming, or image scaling on the optical inspection image Img_1 to facilitate subsequent inspection of determining whether the test image F1 displayed by the display device is as expected according to the optical inspection image Img_1.

In a step S303, the computation device 130 performs color space transformation on the optical inspection image Img_1 to obtain a brightness channel image and a color channel image of the optical inspection image Img_1. Generally, the photosensitive element of the image capturing device 120 generates image information of an RGB color space, i.e. the image capturing device 120 provides the optical inspection image Img_1 in the RGB color space to the computation device 130. The computation device 130 may transform the optical inspection image Img_1 from the RGB color space to a specific color space based on a color transformation matrix to obtain the brightness channel image with brightness information and the color channel image with color information, so as to separate the brightness information and the color information of the optical inspection image Img_1.

In an embodiment of the invention, the specific color space is a Lab color space, a YCbCr color space, an HSV color space, or other color space with an independent brightness channel. Correspondingly, the brightness channel image may be an L-channel image in the Lab color space, a Y-channel image in the YCbCr color space, or a V-channel image in the HSV color space, etc. The color channel image may be an a-channel image in the Lab color space, a b-channel image in the Lab color space, a Cb-channel image in the YCbCr color space, a Cr-channel image in the YCbCr color space, an H-channel image in the HSV color space, or an S-channel image in the HSV color space, etc. However, in the embodiment of the invention, the computation device 130 may transform the optical inspection image Img_1 from the RGB color space to the Lab color space and take one or more color channel images of the optical inspection image Img_1 (for example, the a-channel image in the Lab color space, the b-channel image in the Lab color space) to perform the color nonuniformity inspection.

In a step S304, the computation device 130 performs background estimation on the color channel image to obtain a color channel background image. In an embodiment, the computation device 130 may use a polynomial background model to perform the background estimation on the color channel image, and the polynomial background model is shown as a following equation (1):

$$f^{(d)}(x, y) = \sum_{0 < m+n < d} a_{mn} x^m y^n \qquad \text{equation (1)}$$

Where, $f^{(d)}(x,y)$ represents a pixel value of a certain pixel coordinate; d is a polynomial order; $a_{mn}$ represents polynomial coefficients to be estimated. These polynomial coefficients $a_{mn}$ may be obtained by using the least-square regression method (LS) for resolving.

In detail, the computation device 130 first substitutes $f^{(d)}(x,y)$ with a color component pixel value (for example, the a-channel pixel value) of each pixel coordinate in the color channel image (for example, the a-channel image) of the optical inspection image Img_1 in the equation (1), and obtains the polynomial coefficients $a_{mn}$ according to the least-square regression method. Then, the computation device 130 calculates the color component pixel value of each pixel coordinate in the color channel background image according to the polynomial coefficients $a_{mn}$ and each pixel coordinate (x,y), so as to obtain the estimated color channel background image.

To be specific, the background estimation is used to filter out small-area noise points in the color channel image of the optical inspection image Img_1, and the color channel background image is a background image after filtering out the small-area noise points. The aforementioned small-area noise points may be caused by factors such as dirty or scratched projection lens, dirty projection screen, dirty or scratched display screen, etc., and these small-area noise points may have an adverse impact on subsequent detection of color nonuniformity. Therefore, in the embodiment of the invention, the computation device 130 may generate the color channel background image that filters the small-area noise points by using the polynomial background model, so as to accurately detect the color nonuniformity region. Moreover, compared to the method of using a noise filter (such as a Gaussion filter) to filter out noise points, the method of filtering out the noise points by using the polynomial background model has less effect on the original color information, which avails the subsequent detection of the color nonuniformity region.

Then, in a step S305, the computation device 130 obtains at least one color nonuniformity region in the test image by respectively comparing an inspection reference value with a plurality of color component pixel values of the color channel background image. The inspection reference value may be a predetermined value or generated by counting pixel information of the color channel background image, and the computation device 130 compares each color component pixel value in the color channel background image with the inspection reference value one by one, so as to detect the color nonuniformity region in the test image F1 according to the difference between each color component pixel value and the inspection reference value. When an absolute difference between the color component pixel value of a certain pixel coordinate and the inspection reference value is too large, it represents that the pixel coordinate belongs to the color nonuniformity region.

It should be noted that in the embodiment where the display device 110 is a projection device, by using the computation device 130 to separate the brightness information and the color information of the optical inspection image and not including the brightness information in the background estimation, the interference on the detection of the color nonuniformity region caused by the uneven brightness of a peripheral part of the projection image that reflects a lens shadow may be reduced, so as to accurately detect the color nonuniformity region in the projection image.

Figure 4:
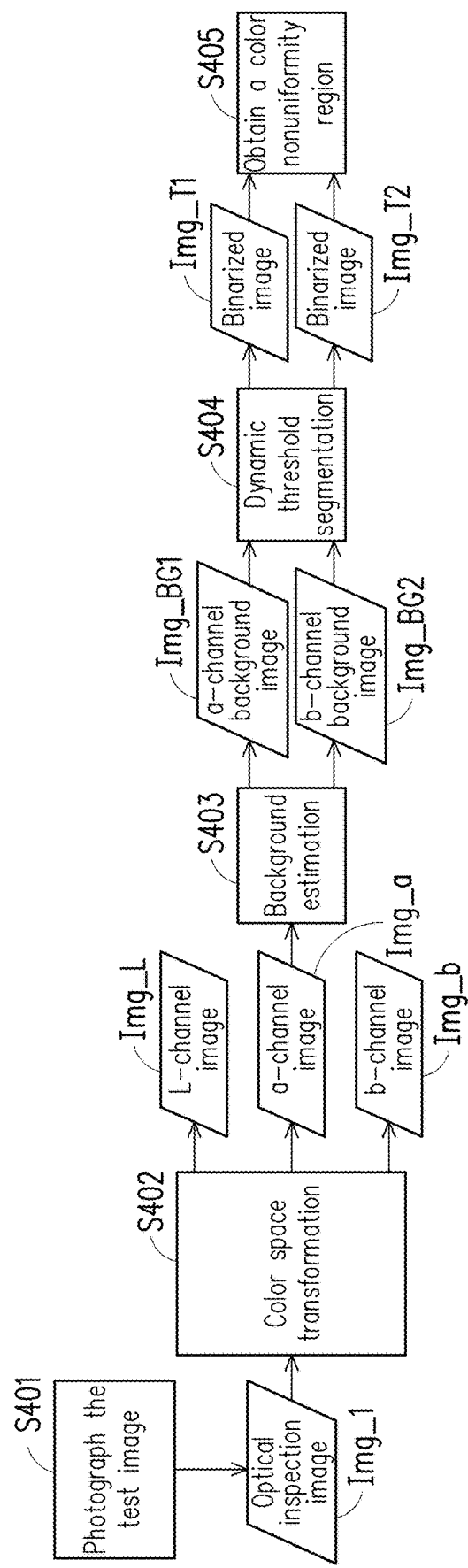
FIG. 4 is a flowchart illustrating a method for inspecting a display image according to an embodiment of the invention.

An embodiment is provided below to describe how to obtain the at least one color nonuniformity region in the test image. FIG. 4 is a flowchart illustrating a method for inspecting a display image according to an embodiment of the invention, and the method of FIG. 4 may be implemented by various components of the display image inspection system 10 of FIG. 1. Referring to FIG. 1 and FIG. 4, steps of the method for inspecting a display image of the embodiment are described below with reference of various components of the display image inspection system 10 of FIG. 1. It should be noted that in the embodiment of FIG. 4, the specific color space is, for example, implemented by the Lab color space.

In a step S401, the image capturing device 120 photographs the test image F1 of the display device to generate the optical inspection image Img_1. In a step S402, the computation device 130 transforms the optical inspection image Img_1 from the RGB color space to the Lab color space based on the color transformation matrix to obtain an L-channel image Img_L, an a-channel image Img_a and a b-channel image Img_b of the optical inspection image Img_1. The L-channel image Img_L includes a brightness pixel value corresponding to each pixel coordinate. The a-channel image Img_a includes an a-channel component pixel value corresponding to each pixel coordinate. The b-channel image Img_b includes a b-channel component pixel value corresponding to each pixel coordinate.

In a step S403, the computation device 130 respectively performs background estimation on the a-channel image Img_a and the b-channel image Img_b to respectively generate an a-channel background image Img_BG1 and a b-channel background image Img_BG2 that filter out the small-area noise points, where the background estimation is performed in the manner described above, which is not repeated.

In a step S404, through dynamic threshold segmentation processing, the computation device 130 performs binarization segmentation processing on the a-channel background image Img_BG1 and the b-channel background image Img_BG2 to respectively generate a binarized image Img_T1 and a binarized image Img_T2. To be specific, the computation device 130 respectively compares the inspection reference value with the color component pixel values of the color channel background image (i.e., the a-channel background image Img_BG1 and the b-channel background image Img_BG2) to perform the binarization segmentation processing on the color channel background image to generate the binarized images Img_T1, Img_T2.

In detail, in an embodiment, the computation device 130 may perform statistical calculation on each of the color component pixel values of the color channel background image (i.e., the a-channel background image Img_BG1 and the b-channel background image Img_BG2) to obtain a pixel average value serving as the inspection reference value. Therefore, when an absolute difference between one of the color component pixel values of the color channel background image and the inspection reference value is greater than the threshold, the computing device 130 may mark a binarized pixel corresponding to one of the color component pixel values in the binarized image as a first value. When the absolute difference between one of the color component pixel values of the color channel background image and the inspection reference value is not greater than the threshold, the computing device 130 may mark the binarized pixel corresponding to one of the color component pixel values in the binarized image as a second value. On the other hand, in an embodiment, the computation device 130 may perform a statistical calculation on each of the color component pixel values of the color channel background image to obtain a standard deviation, where the threshold used for the binarization segmentation processing is the standard deviation multiplied by a threshold parameter. However, in another embodiment, the threshold used for the binarization segmentation processing may also be a predetermined parameter.

Referring to the embodiment of FIG. 4, the computation device 130 may perform a statistical calculation on each of a-channel component pixel values of the a-channel background image Img_BG1 to obtain a pixel average value of the a-channel component pixel values. The pixel average value may serve as the inspection reference value used for determining whether there is color nonuniformity. Then, the computation device 130 may determine one by one whether an absolute difference between each of the a-channel component pixel values of the a-channel background image Img BG1 and the inspection reference value is greater than a threshold, so as to generate each binarized pixel on the binarized image Img_T1. When the absolute difference between the color component pixel value and the inspection reference value is greater than the threshold, the computation device 130 may mark the binarized pixel on the binarized image Img_T1 as "1". When the absolute difference between the color component pixel value and the inspection reference value is not greater than the threshold, the computation device 130 may mark the binarized pixel on the binarized image Img_T1 as "0". To be specific, generation of each of the binarized pixels on the binarized image Img_T1 may be represented by a following equation (2).

$$O(x, y) = \begin{cases} 1, & \text{if } |B(x, y) - \mu|/\delta > k \\ 0, & \text{if } |B(x, y) - \mu|/\delta \leq k \end{cases} \quad \text{equation (2)}$$

Where, O(x,y) is a binarized pixel of a certain pixel coordinate in the binarized image; B(x,y) is a color component pixel value of a certain pixel coordinate in the color channel background image: p is a pixel average value of the color component pixel values serving as the inspection reference value; S is a pixel standard deviation of the color component pixel values; and k is a threshold parameter.

Similarly, the computation device 130 may also calculate a pixel average value and a pixel standard deviation of the b-channel component pixel values of the b-channel background image Img_BG2 to obtain another inspection reference value and another threshold. Based on the same principle, the computation device 130 may generate the binarized image Img_T2 according to the another inspection reference value and the another threshold corresponding to the b-channel background image Img_BG2.

In a step S405, the computation device 130 obtains at least one color nonuniformity region according to an image block marked as the first value in the binarized image Img_T1 and the binarized image Img_T2. In the embodiment of FIG. 4, the at least one color nonuniformity region may include a first color nonuniformity region corresponding to the a-channel image Img_a and a second color nonuniformity region corresponding to the b-channel image Img_b.

Figure 5:
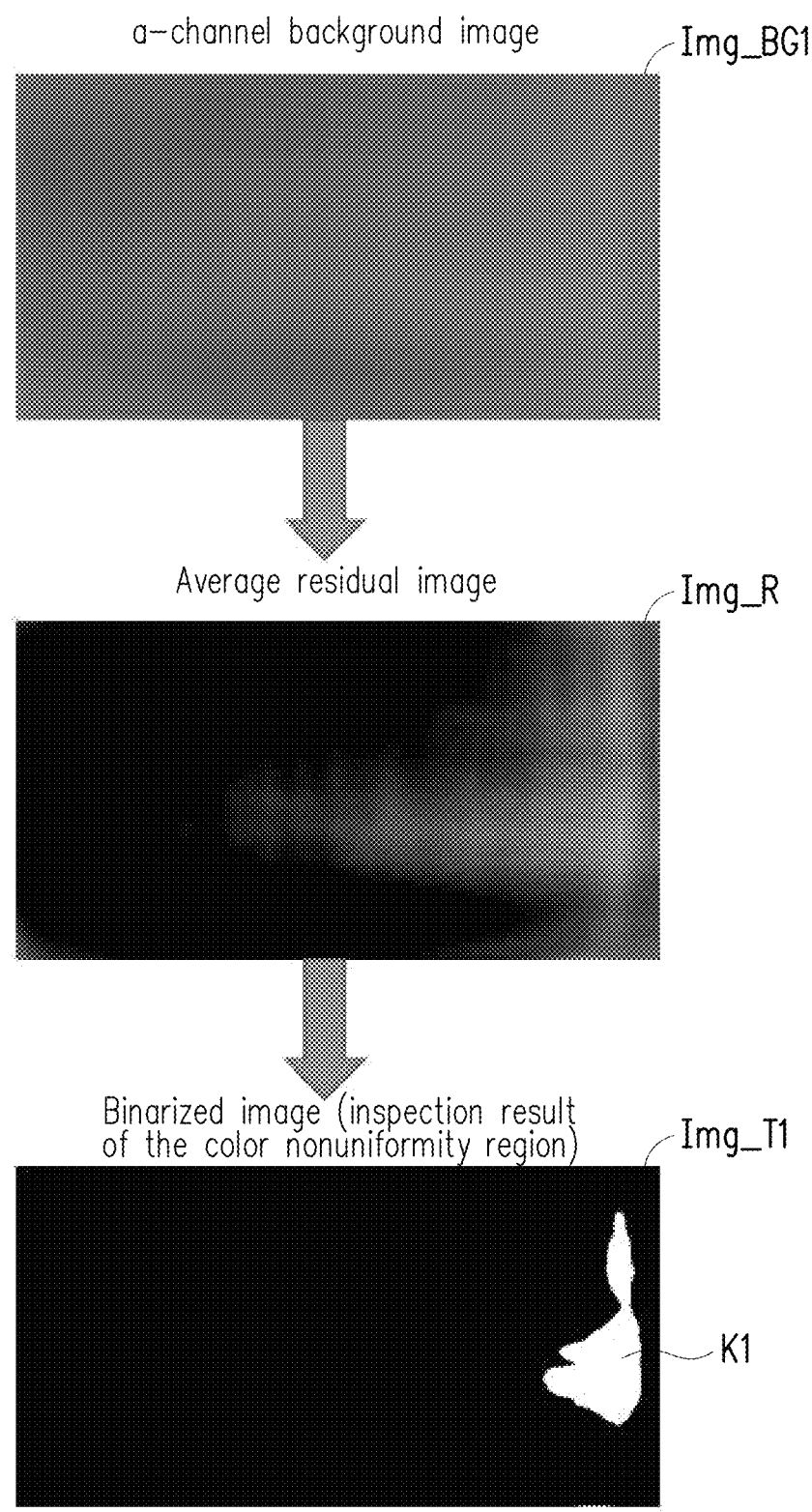
FIG. 5 is a schematic diagram of a color channel image, a binarized image and a color nonuniformity region according to an embodiment of the invention.

For example, FIG. 5 is a schematic diagram of a color channel image, a binarized image and a color nonuniformity region according to an embodiment of the invention. Referring to FIG. 5, the computation device 130 may calculate the pixel average value and the pixel standard deviation of the a-channel pixel values in the a-channel background image Img_BG1. Then, the computation device 130 may subtract the pixel average value from each of the a-channel pixel values in the a-channel background image Img_BG1 and take absolute values thereof to obtain an average residual image Img_R. The computation device 130 may compare the absolute difference corresponding to each pixel coordinate in the average residual image Img_R with a threshold, and generate the binarized image Img_T1 according to a comparison result. As shown in FIG. 5, a white color block shown in the binarized image Img_T1 is a color nonuniformity region K1 in the test image F1. In addition to detecting the color nonuniformity region in the test image F1 according to the binarized image Img_T1, the computation device 130 may also obtain related information of the color nonuniformity region (such as a position, an area size of the region, etc.) based on the binarized image Img_T1, which may be used for other inspection applications.

In summary, in the embodiments of the invention, detection of the color nonuniformity region is performed in case that the brightness information and the color information of the optical inspection image are separated, so as to avoid the adverse interference of the brightness information on the detection of the color nonuniformity region. Moreover, in the embodiment of the invention, the small-area noise is filtered by the background estimation, which improves the recognition accuracy of the color nonuniformity region without affecting the original color information as much as possible. Therefore, the embodiments of the invention may accurately inspect whether the display image provided by the display device has color nonuniformity. Moreover, in the embodiments of the invention, inspection of the display device may be completed by analyzing the optical inspection image generated by capturing the display image, which may effectively mitigate misjudgment of manual inspection and inconsistency of the inspection result. Moreover, additional aspects and advantages of the invention may be learned from the description of the techniques disclosed in the invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for inspecting a display image, adapted for a display image inspection system, the method comprising:
   displaying a test image on a display surface through a display device;
   generating an optical inspection image by photographing the test image on the display surface by an image capturing device;
   performing color space transformation on the optical inspection image to obtain a brightness channel image and a color channel image of the optical inspection image;
   performing background estimation on the color channel image of the optical inspection image to obtain a color channel background image, wherein the background estimation is not performed on the brightness channel image of the optical inspection image; and
   obtaining at least one color nonuniformity region in the test image by respectively comparing an inspection reference value with a plurality of color component pixel values of the color channel background image.

2. The method for inspecting a display image as claimed in claim 1, wherein the step of obtaining the at least one color nonuniformity region in the test image by respectively comparing the inspection reference value with the color component pixel values of the color channel background image comprises:
   performing binarization segmentation processing on the color channel background image to generate a binarized image by respectively comparing the inspection reference value with the color component pixel values of the color channel background image; and
   obtaining the at least one color nonuniformity region according to an image block marked as a first value in the binarized image.

3. The method for inspecting a display image as claimed in claim 2, wherein the step of performing binarization segmentation processing on the color channel background image to generate the binarized image by respectively comparing the inspection reference value with the color component pixel values of the color channel background image comprises:

performing a statistical calculation on each of the color component pixel values of the color channel background image to obtain a pixel average value serving as the inspection reference value;

marking a binarized pixel corresponding to one of the color component pixel values in the binarized image as the first value when an absolute difference between the one of the color component pixel values and the inspection reference value is greater than a threshold; and marking a binarized pixel corresponding to one of the color component pixel values in the binarized image as a second value when an absolute difference between the one of the color component pixel values of the color channel background image and the inspection reference value is not greater than the threshold.

4. The method for inspecting a display image as claimed in claim 3, further comprising:

performing the statistical calculation on each of the color component pixel values of the color channel background image to obtain a standard deviation, wherein the threshold is the standard deviation multiplied by a threshold parameter.

5. The method for inspecting a display image as claimed in claim 1, wherein the step of performing the color space transformation on the optical inspection image to obtain the brightness channel image and the color channel image of the optical inspection image comprises:

transforming the optical inspection image from an RGB color space to a specific color space based on a color transformation matrix, to obtain the brightness channel image and the color channel image.

6. The method for inspecting a display image as claimed in claim 5, wherein the specific color space is a Lab color space.

7. The method for inspecting a display image as claimed in claim 6, wherein the color channel image comprises an a-channel image and a b-channel image, the brightness channel image is an L-channel image, and the at least one color nonuniformity region comprises a first color nonuniformity region corresponding to the a-channel image and a second color nonuniformity region corresponding to the b-channel image.

8. The method for inspecting a display image as claimed in claim 1, wherein the test image is a single color image.

9. The method for inspecting a display image as claimed in claim 1, wherein the display device is a projection device, and the display surface is a projection surface.

10. A display image inspection system, comprising:

a display device, displaying a test image on a display surface;

an image capturing device, photographing the test image on the display surface to generate an optical inspection image; and a computation device, connected to the image capturing device, performing color space transformation on the optical inspection image to obtain a brightness channel image and a color channel image of the optical inspection image, performing background estimation on the color channel image of the optical inspection image to obtain a color channel background image, wherein the background estimation is not performed on the brightness channel image of the optical inspection image, and obtaining at least one color nonuniformity region in the test image by respectively comparing an inspection reference value with a plurality of color component pixel values of the color channel background image.

11. The display image inspection system as claimed in claim 10, wherein the computation device respectively compares the inspection reference value with the color component pixel values of the color channel background image to perform binarization segmentation processing on the color channel background image to generate a binarized image, and obtains the at least one color nonuniformity region according to an image block marked as a first value in the binarized image.

12. The display image inspection system as claimed in claim 11, wherein the computation device performs a statistical calculation on each of the color component pixel values of the color channel background image to obtain a pixel average value serving as the inspection reference value, wherein when an absolute difference between one of the color component pixel values and the inspection reference value is greater than a threshold, the computation device marks a binarized pixel corresponding to the one of the color component pixel values in the binarized image as the first value, and when an absolute difference between one of the color component pixel values of the color channel background image and the inspection reference value is not greater than the threshold, the computation device marks a binarized pixel corresponding to the one of the color component pixel values in the binarized image as a second value.

13. The display image inspection system as claimed in claim 12, wherein the computation device performs the statistical calculation on each of the color component pixel values of the color channel background image to obtain a standard deviation, wherein the threshold is the standard deviation multiplied by a threshold parameter.

14. The display image inspection system as claimed in claim 10, wherein the computation device transforms the optical inspection image from an RGB color space to a specific color space based on a color transformation matrix, to obtain the brightness channel image and the color channel image.

15. The display image inspection system as claimed in claim 14, wherein the specific color space is a Lab color space.

16. The display image inspection system as claimed in claim 15, wherein the color channel image comprises an a-channel image and a b-channel image, the brightness channel image is an L-channel image, and the at least one color nonuniformity region comprises a first color nonuniformity region corresponding to the a-channel image and a second color nonuniformity region corresponding to the b-channel image.

17. The display image inspection system as claimed in claim 10, wherein the test image is a single color image.

18. The display image inspection system as claimed in claim 10, wherein the display device is a projection device, and the display surface is a projection surface.

* * * * *